United States Patent Office 3,645,920
Patented Feb. 29, 1972

3,645,920
PROCESS OF POLYMERIZING A 1,2-MONO-EPOXIDE WITH A POLYMERIC HYDROCARBYL ALUMINUM ALKOXIDE CATALYST
Robert K. Schlatzer, Jr., Chagrin Falls, Ohio, assignor to The B. F. Goodrich Company, New York, N.Y.
No Drawing. Filed Apr. 14, 1969, Ser. No. 816,097
Int. Cl. C08g 23/14
U.S. Cl. 260—2 A                    4 Claims

ABSTRACT OF THE DISCLOSURE

There is disclosed a process of polymerizing an epoxide-type monomer such as epichlorohydrin or ethylene oxide employing a new catalyst comprising the complex reaction product of a polymeric hydrocarbyl aluminum alkoxide containing Al—O—Al type linkages with (1) a chelator, (2) water and optionally (3) an ether. Such process produces rubbery polymerized epoxides having a polyether structure which have higher molecular weights and, with the epihalohydrins polymerized alone, more regular structures as indicated by higher crystallinity indices than corresponding polymers made with prior catalysts. The new catalysts also provide a higher yield of polymer per unit of catalyst at more vigorous reaction rates than do prior catalysts. The polyether type rubbers have considerable commercial utility because of their properties of good solvent-, fuel-, oil- and ozone-resistance which are effectively retained over a wide range of temperatures.

BACKGROUND OF THE INVENTION

Epoxides such as ethylene oxide, propylene oxide, epichlorohydrin and others polymerize with organoaluminum catalysts to form rubbery or elastomeric polymers having a polyether structure and which, in a vulcanized or cured state, possess highly valuable properties including good resistance to solvents, fuels, oils and ozone. Such properties are realized in such vulcanizates over a wide range of service temperatures. Rubbery epichlorohydrin homopolymers exhibit impermeability to gases several magnitudes greater than that of butyl rubber. Such polyether rubbers combine many of the best properties of a spectrum of older special-purpose synthetic rubbers such as the acrylic rubbers, nitrile rubbers, butyl rubber and the like. Such polyether rubbers are prepared from monomeric materials which, potentially at least, are inexpensive and readily-available. However, the polyether rubbers have been expensive to produce because the known organoaluminum catalysts for their production are expensive and the yield of elastomer per unit of catalyst has been quite low. Moreover, the known organoaluminum catalysts have exhibited marginal ability to induce, in a controllable manner, the higher molecular weight required for best elastomeric properties in the polyether rubber products.

Prior organoaluminum catalysts thus employed, for example those of U.S. Pat. 3,219,591, are of the type prepared by reacting a hydrocarbyl aluminum compound (a compound of aluminum in which from 1 to 3 hydrocarbon groups are present each bound to aluminum by a carbon-aluminum bond) with various modifying substances such as water, chelators, ethers, etc. The better chelators employed, for example acetyl acetone, are expensive and are required in fairly large proportion thereby constituting a very sizable portion of the total catalyst cost. Such known catalysts produce yields of polymer with commercially-available epoxide monomers in the range of from about 5 to about 15 lbs. of rubber per pound of aluminum employed in the catalyst, a very low yield as compared to yields with other organoaluminum catalysts in the preparation of other polymers, for example, high-density polyethylenes.

SUMMARY OF THE INVENTION

I have discovered that monomeric epoxides may be converted to high molecular weight polyether elastomers with high yields of elastomer per unit of catalyst by new polymerization process employing a new and novel organo-aluminum catalyst derived from a "polymeric" hydrocarbyl aluminum alkoxide, i.e., a mixture of organo-aluminum compounds containing (1) hydrocarbyl aluminum groups (i.e. hydrocarbon groups attached to aluminum by primary carbon-aluminum bonds), (2) alkoxide groups, and (3) "polymeric" or repeating Al—O—Al alumino-oxide linkages (i.e. linkages in which aluminum atoms and oxygen atoms alternately repeat). Such polymeric hydrocarbyl aluminum alkoxide is prepared by exhaustively reacting a hydrocarbyl aluminum compound as defined below, with carbon dioxide at or near room temperature until substantially no further reaction occurs producing a thick, viscous reaction mixture not subject to separation by ordinary vacuum distillation into identifiable reaction products (reaction mixture decomposes before vaporizing, even under vacuum) but which is quite readily soluble in monomeric epoxides, in organic solvents and/or in monomer/solvent mixtures. Such a product on analysis using Nuclear Magnetic Resonance ("NMR") spectra are shown to contain Al—O—Al type linkages including Al—O—Al—O—Al type polymeric alumino-oxide linkages. For example, a typical product of this type is the product of the reaction at room temperature of undiluted (pure) triethyl aluminum with carbon dioxide until no further heat of reaction is evolved when approximately 0.43 mole of carbon dioxide (determined by weight gain) per mole of aluminum is taken up. NMR analysis reveals that at least the following series of reactions have occurred:

$$6Et_3Al + 3CO_2 \longrightarrow 3Et_2Al\text{-}O\text{-}AlEt_2 + Et_2Al\text{-}O\text{-}C(CH_3CH_3)_3$$

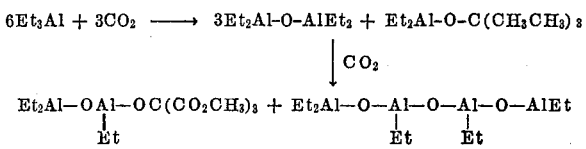

wherein "Et" is an ethyl group. Note that several products of the reaction appear to contain an alcohol group containing seven carbon atoms attached to aluminum.

Catalysts prepared from such polymeric hydrocarbyl aluminum alkoxides provide in the process of the invention high polymerization rates and high yields of polymer per unit of catalyst. As will be demonstrated herein, the process employing such catalysts provides a unique means of tailoring reaction characteristics through controlling molecular weight of the polymer and the reaction rate more or less independently one from the other.

DETAILED DESCRIPTION

The catalysts of this invention are prepared by reacting the polymeric hydrocarbyl aluminum alkoxide with (1) water, (2) a chelator, and optionally, (3) an ether.

The hydrocarbyl aluminums which may be employed to produce the polymeric hydrocarbyl aluminum alkoxide include the trihydrocarbyl aluminums and the dihydrocarbyl aluminum hydrides including triethyl aluminum, tri (n-butyl) aluminum, triisobutyl aluminum, tri (2-ethylhexyl) aluminum, triphenyl aluminum, tricyclohexyl aluminum, diethyl phenyl aluminum, diethyl aluminum hydride, dibutyl aluminum hydride, di (2-ethyl-hexyl) aluminum hydride, ethyl phenyl aluminum hydride, diphenyl aluminum hydride and many others. Much preferred are the trialkyl aluminums and dialkyl aluminum hydrides wherein each alkyl group contains from 2 to 4 carbon atoms. Most preferred because of its realy availability and lower cost is triethyl aluminum which gives a greater number of active catalyst species per unit weight than do higher alkyl aluminums.

The chelator employed in producing the catalysts of this invention are organic compounds which coordinate with the aluminum in an organoaluminum compound forming a ring compound. Such chelators are characterized by two or more functional groups one of which is a group such as an —OH group or an —SH group which reacts with aluminum forming a conventional covalent bond such as an aluminum-oxygen or aluminum-sulfur bond and the other of which contains an oxygen, nitrogen or sulfur atom that forms a coordinate bond with aluminum. Such latter functional group may be a carbonyl group, an ester group, a carbonyl group, a sulfoxide group, a sulfone group, a nitroso or nitro group, an amino group, a thiocarbonyl

group, a thiocarboxylic group

a thio group group

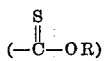

and others. It is preferred that the chelator form with aluminum a five- or six- membered ring (including aluminum). Illustrative chelators of this class include diketones such as acetyl acetone (preferred), trifluoroacetylacetone, benzoylacetone, furoylacetone, dibenzoyl methane, 3-benzyl-2,4-pentane-dione, and others, ketoacids such as acetoacetic acid and others, ketoesters such as ethyl acetoacetate; ketoaldehydes such as formylacetone and others; hydroxyketones such as hydroxethyl methyl ketone, hydroxyacetone, and others; hydroxyaldehydes such as salicylaldehyde and others; hydroxyesters such as ethyl glycollate, 2-hydroxyethyl acetate and others; dicarboxylic acids and their ester such as oxalic acid, malonic acid, mono-esters of oxalic acid, and others; dialdehydes such as malonaldehyde and others; alkoxyacids such as ethoxyacetic acid and others; ketoximes and dialdehyde monooximes such as glyoxal monooxime, and others; the nitroalcohols, the nitroaldehydes, the nitroketones, the nitrocarboxylic acids, and many others.

The optional third catalyst-forming ingredient is an ether which may be any of the dialkyl, diaryl, alkaryl, aralkyl and cycloalkyl ethers such as for example, diethyl ether, dipropyl ether, diisopropyl ether, ethylphenyl ether, diphenyl ether, tetrahydrofuran, and many others. Of these, most preferred is tetrahydrofuran. The ether ingredient is believed to coordinate or complex with the aluminum in the well known manner and functions as a combined activator/solubilizer for the catalyst. The use of the ether results in a generalized improvement in the reaction where reaction rates, yields, and the molecular weight of the polymer may all be improved. Compared to the other catalyst-forming ingredient, the optional ether ingredient has a relatively mild effect.

PREPARATION OF ALKOXIDE

The polymeric hydrocarbyl aluminum alkoxide is formed by the direct reaction of a hydrocarbyl aluminum compound of the class described with dry carbon dioxide under substantially anhydrous conditions and at moderate reaction temperatures of from about 15 to 20° C. to about 30–35° C. while carefully excluding the oxygen and moisture of the atmosphere so as to minimize decomposition or destruction of the hydrocarbyl aluminum moities (really to control and render repeatable the later reaction with water). The reaction should be carried out so as to maximize the take-up of carbon dioxide. While any of the solvents hereafter recited as polymerization solvent media may be present as a diluent during the reaction to reduce the high viscosity of the polymeric alkoxide, it is preferred to carry out the reaction in the absence of such diluents. Contrary to many literature references, for example U.S. Pat. No. 3,219,591, carbon dioxide is not a catalyst poison in the polymerization of epoxides when the carbon dioxide is prereacted with the aluminum compound and such reaction is driven essentially to completion. A hydrocarbyl aluminum so reacts, as determined by weight gain, with from about 0.40 to 0.45 mole of carbon dioxide per mole of aluminum when no further heat of reaction is detected. However, for the purposes of this invention such polymeric alkoxides in which from about 0.35 to 0.45 mole of carbon dioxide per mole of aluminum have been combined (and which contain the repeating alumino-oxide —Al—O—Al′-type linkages) are similar in their catalytic effects although the completely reacted products containing from about 0.425 to 0.45 mole of combined carbon dioxide per mole of aluminum are preferred.

PREPARATION OF CATALYST

The polymeric alkoxides of this invention are converted to highly active catalysts by reacting such alkoxide, in any order, with water, a chelator and, optionally an ether. These steps are carried out at or below room temperature (i.e. not higher than about 25° C.) and preferably at a temperature of 10° C. or lower while removing any heat of reaction as fast as liberated. Since the interaction of the alkoxide with water and the chelators is vigorous (interaction of the ether ingredient with the alkoxide is very mild), the water and chelator are intermixed with the alkoxide slowly while stirring and cooling to allow proper control of temperature. The combining of the ingredients is preferably carried out in a solvent for the alkoxide since the latter is a very viscous material. Solvents for the latter purpose preferably are any of the polymerization solvents recited herein in order to avoid undue complication of solvent recycle systems. In most cases the ether additive, if any, may be present during the addition of the other catalyst ingredients.

In this fashion there is added from about 0.15 to about 0.50 mole, more preferably from about 0.25 to about 0.40 mole, of water per mole of aluminum in the polymeric alkoxide ingredient (as originally charged). Within the range stated, the water functions as a polymerization rate controller with only mild effects on polymer molecular weight. The rate of polymerization appears to increase to a maximum at about 0.35 to 0.38 mole of water per mole of aluminum and then decreases slowly, although reaction rates are still appreciable at the level of about 0.45 mole/mole.

Also, in this fashion, there are added from about 0.1 to about 0.50 mole, more preferably from about 0.25 to about 0.45 mole, of a chelator per mole of aluminum in the polymeric aluminum alkoxide. In such range, the chelator functions as a molecular weight controller in the polymerization reaction since the molecular weight of the polymer increases with increase in chelator in the range recited reaching a maximum near a value between about 0.35 to 0.40 mole of chelator per mole of aluminum and then levels off somewhat with molecular weight. The molecular weight control function of the chelator becomes somewhat less clear at the higher chelator levels when combined with the lower or the higher levels of water. Thus, the preferred intermediate levels of both water and chelator produce the highest yields and conversions of the highest molecular weight polymers. The process user may by suitable selection of the proportion of water and chelator exercise considerable control over both rate and molecular weight.

In the same fashion, the proportion of the ether additive may also be varied but over a considerably broader range. The function of the ether is more difficult to characterize since it seems to increase both polymer yield and polymer molecular weight, although such effects are difficult to relate to the proportions of ether employed. Unlike other modifiers, the effects of ether addition do not seem to peak at any particular level of ether, rather, the presence of at least a minimum proportion of the ether is manifested in a general all-around improvement in rate, yield, and product molecular weight. For these reasons it is preferred to employ at least about 4 moles of ether per mole of aluminum in the catalyst. More preferred proportions are in the range of from about 10 to 15 moles of ether per mole of aluminum. Diethyl ether and tetrahydrofuran are the preferred ethers.

In contrast, in prior known organoaluminum catalysts of this type, the proportion of water and chelator are said ostensibly to be susceptible of varying from about 0.1 to about 1.5 moles per mole of aluminum in the hydrocarbyl aluminum ingredient whereas optimum levels for most purposes occur in the range of 0.5 to 0.8 mole/mole of aluminum. The catalysts of this invention utilize lower levels as given above and, in this sense, the polymeric alkoxide can be considered to be an already-modified, already-activated organoaluminum catalyst ingredient.

MONOMERS POLYMERIZED

The catalysts and process of this invention are useful in the polymerization of a wide range of epoxide-type monomers including the alkylene oxides such as ethylene oxide, propylene oxide, the butene oxides; the substituted alkylene oxides including the epihalohydrins such as epichlorohydrin and epibromohydrin, trifluoromethyl ethylene oxide, and others, 1,1-dichloro-2,3-epoxypropene, the cycoaliphatic epoxides such as cyclohexene oxide, vinyl cyclohexene oxide, epoxy ethers including the alkyl glycidyl ethers such as methyl glycidyl ether, ethyl glycidyl ether, phenyl glycidyl ether, unsaturated glycidyl ethers including allyl glycidyl ethers, glycidyl pivalate, butadiene mono- and dioxides, and many others.

Preferred monomeric materials for use in the polymerization process of this invention include the alkylene oxides and mixtures of two or more thereof; the epihalohydrins and mixtures of two or more thereof, mixtures of an epihalohydrin and a minor proportion of an alkylene oxide such as ethylene oxide both with and without a minor proportion of a third type of epoxide monomer including a glycidyl ether such as phenyl glycidyl ether, ethyl glycidyl ether, allyl glycidyl ether; and others. Most preferred monomers are selected from the class consisting of the epihalohydrins such as epichlorohydrin polymerized alone; propylene oxide polymerized alone; and the mixtures of epichlorohydrin and from about 1 mol percent to about 20 mol percent of an alkylene oxide such as ethylene oxide.

POLYMERIZATION

The polymerization of such epoxide monomers by the process of this invention is carried out with the catalysts described above either in mass (i.e. no solvent) or, more preferably, in a solvent, which dissolves both the monomers and the catalyst. The use of a solvent reduces viscosity, simplifies heat transfer, and facilitates control of monomeric concentration during polymerization. Suitable solvents are the liquid hydrocarbons such as toluene, benzene, hexane, heptane, cyclohexane, and the like; halohydrocarbons such as methyl chloride, ethyl chloride, chloroform, carbon tetrachloride, and others; the dialkyl, aryl or cycloalkyl ethers such as for example diethyl ether, dipropyl ether, tetrahydrofuran, ethyl phenyl ether, and others.

The polymerization reaction can be carried out over a wide range of temperatures ranging from about −30° to about 100° C., although temperatures ranging from about 10° to about 100° C. are preferred. A narrower range of temperature from about 75° to 100° C. is most preferred since the catalysts of this invention produce high quality, high molecular weight polymeric products even at 100° C.

Molecular weight hereinafter will be specified in terms of "Reduced Solution Viscosity" or "RSV" a point value viscosity determined as the viscosity at 25° C. of a solution of 0.1 gram of polymer dissolved in 100 ml. of dimethyl formamide containing 3%/vol. of acetylacetone (expressed as deciliter/gram or dl./g.).

The polymerization reaction may be carried out at autogenous pressures although superatmospheric pressures of up to 10 atmospheres or more may be employed with some advantage with the more volatile epoxide monomers. Subatmospheric pressures may also be employed with those monomers and/or solvents having the requisite volatilities at reaction temperatures permitting reflux cooling of the reaction mixture by boiling off one or more ingredients, condensing the same and returning the liquid to the reactor.

In general, the proportion of catalyst required will be equivalent to between about 0.01 and about 0.35 milligram atoms (mmg) of aluminum (in the catalyst) for every 1 gram of total monomers. It is preferred to utilize a proportion of catalyst equivalent to between about 0.03 and about 0.2 mmg of aluminum per gram of monomer.

The invention will now be more fully described by reference to several specific examples which are intended as being illustrative only and not as limiting the invention.

EXAMPLE 1

Preparation of alkoxide

About 54.77 grams (about 0.48 mole) of pure triethyl aluminum (hereinafter "TEAl") is added to a glass beverage bottle while maintaining therein at atmosphere of dry, oxygen-free nitrogen gas. A total tare weight of the bottle and contents is then recorded. Carbon dioxide gas is passed first through a tube packed with 3A molecular sieves to remove moisture and then into the liquid TEAl through a dipe tube while stirring the liquid. The bottle is immersed in cooling water and the flow rate of the carbon dioxide adjusted so the temperature of the TEAl liquid is controlled between about 22° and about 28° C. The addition of carbon dioxide is continued in this manner until no further evolution of heat can be detected. The bottle and liquid contents are then purged of unreacted carbon dioxide by flushing with nitrogen gas and the total weight of the bottle and its contents again determined and recorded.

It is found that about 0.43 mole of carbon dioxide per mole of TEAl has been absorbed. This polymeric ethyl aluminum alkoxide is characterized by NMR and the description occurs above under Summary of Invention.

Preparation of catalyst

About 7.83 grams of the polymeric TEAl:0.43$CO_2$ reaction product are added to a mixture of about 22 ml. of toluene and 79 ml. (13 mole/mole Al) of diethyl ether in a pressure-type beverage bottle under a dry nitrogen atmosphere. The mixture is stirred until a homogeneous solution is obtained. To such solution there are added in a gradual fashion about 0.31 ml. of water over a period of 60 minutes followed by the addition in a similar fashion over a period of about 40 minutes about 2.15 grams of acetylacetone. During these additions the temperature of the solution is carefully maintained at a temperature of about 0° C. by applying cooling to the exterior of the bottle. The final product is a clear, nearly water-white solution. The ingredients thus combined are in the molar ratios of 1 TEAl:0.43 $CO_2$:0.37 $H_2O$:0.37 acetylacetone: 13 ethyl ether.

Polymerization procedure

Toluene, liquid epichlorohydrin and liquid ethylene oxide are combined and sealed in a pressure-type beverage bottle under an oxygen-free nitrogen atmosphere. The resulting mixed liquids contain about 30%/wt. of the combined monomers and the ethylene oxide constitutes about 10%wt. based on the total monomers. Each bottle and its contents are heated to about 90° C. in an oil bath for about one-half hour before the catalyst solution is added. After catalyst addition, the bottles are returned to the 90° C. oil bath and agitated by being tumbled end-over-end for 5 hours after which each bottle is removed, about 10 ml. of a shortstop solution (prepared by combining about 20 grams of phenyl-beta-naphthylamine antioxidant, 200 ml. of ethanol and 100 ml. of toluene) are then added to destroy the catalyst and terminate the polymerization reaction. In each case, heptane is added to the shortstopped polymer solution to precipitate the rubber as crumbs which are filtered off, washed with heptane and dried in a vacuum oven at 50–60° C.

A series of experiments employing the above described and other catalysts are employed. In some of these, one or more of the catalyst-forming ingredients are either omitted or varied in proportion. A number of control-type experiments also are included, in one of which the TEAl:0.43CO$_2$ product is employed alone and in another of which unmodified TEAl is employed. In all such experiments, the proportion of catalyst employed is equivalent to about 0.05 millimole of aluminum per gram of monomers. Table I below lists these data:

TABLE I

| Experiment No. | Molar catalyst composition | Yield-grams polymer per gram Al in catalyst | RSV [1] |
|---|---|---|---|
| 66 | TEAl:0.43 CO$_2$ | 7.0 | 1.4 |
| 68 | TEAl:0.43 CO$_2$/0.3 H$_2$O/13 Et$_2$O [2] (no chelator) | 10.3 | 1.2 |
| 68A | 68 plus 0.2 acetylacetone | 16.4 | 3.0 |
| 88A | TEAl:0.43 CO$_2$/0.3 H$_2$O/0.3 AcAc/13 Et$_2$O [3] | 17.9 | 5.1 |
| 70B | TEAl:0.43 CO$_2$/0.3 H$_2$O/0.35 AcAc/13 Et$_2$O | 18.4 | 5.4 |
| 64B | TEAl:0.43 CO$_2$/0.3 H$_2$O/0.5 AcAc/13 Et$_2$O | 11.7 | 5.6 |
| 86A | TEAl:0.43 CO$_2$/0.37 H$_2$O/0.37 AcAc/13 Et$_2$O | 20.9 | 5.7 |
| Control | TEAl/0.37 H$_2$O/0.37 AcAc/13 Et$_2$O | 17.8 | 3.4 |
| Control | TEAl/0.6 H$_2$O/1.0 AcAc/13 Et$_2$O | 10.9 | 3.1 |

[1] As described, see text.
[2] "Et$_2$O" means diethyl ether.
[3] "AcAc" means acetylacetone.

EXAMPLE 2

The experiments of Example 1 are repeated employing monomer concentration of 10%/wt. and employing only about 8%/wt. of ethylene oxide in the monomeric mixture. In these experiments, the polymerization reaction is carried out for only 2 hours at 90° C. Table II below lists these data:

TABLE II

| Experiment No. | Molar catalyst composition | Yield-grams polymer per gram monomer | RSV [1] |
|---|---|---|---|
| 66 | TEAl:0.43CO$_2$ | 2.9 | 1.8 |
| 68B | Same as Table I | 4.3 | 2.1 |
| 68A | do | 7.4 | 6.5 |
| 88A | do | 9.0 | 7.9 |
| 70B | do | 8.8 | 8.6 |
| 64B | do | 6.1 | 3.6 |
| 86A | do | 10.9 | 10.2 |

[1] See text.

The experiments in Examples 1 and 2 indicate a markedly greater activity for the catalysts of this invention prepared from the polymeric hydrocarbyl aluminum alkoxide as compared to both the alkoxide employed alone or to the optimized prior art catalysts prepared from unmodified triethyl aluminum.

EXAMPLE 3

In this example, homopolymers of epichlorohydrin are prepared employing several of the catalyst solutions described in Example 1. In each case there are utilized a reaction mixture containing 140 ml. of toluene and 38 ml. of epichlorohydrin to which there are added about 0.5 ml. (or about 0.05 millimole of TEAl per gram of monomers) of the particular catalyst per gram of monomer.

The procedure is otherwise similar to that of Example 1 with the polymerization being conducted for 5 hours at 90° C. To serve as controls, experiments are included wherein (1) the unmodified TEAl:0.43 CO$_2$ polymeric alkoxide is employed as the sole catalyst and (2) unmodified triethyl aluminum (TEAl) is employed as a substitute for the alkoxide. The data are as follows:

TABLE III.—POLYEPICHLOROHYDRIN

| Catalyst | Crystalline [1] Yield [2] | Index | RSV [3] | Polymer description |
|---|---|---|---|---|
| (1) TEAl:0.43 CO$_2$ | 15.6 | 24 | | Mixture of sticky low mol wt. polymer and higher mol wt. |
| (2) TEAl:0.43 CO$_2$/0.37 H$_2$O/13 AcAc/13 Et$_2$O | 22.5 | 38 | | Tough, white polymer, homogeneous. |
| (3) TEAl:0.37 H$_2$O/17.4 0.37 AcAc/13 Et$_2$O | 17.4 | 29 | 3.4 | Tough rubber homogeneous. |
| (4) TEAl:0.43 CO$_2$/0.3 H$_2$O/13 Et$_2$O | 18.3 | 44 | | Tough rubber homogeneous. |

[1] See below.
[2] Grams polymer per gram of TEAl in catalyst.
[3] Same as in Example 1.

It is clear from these data that the epichlorohydrin homopolymer rubbers made with the process and catalyst of this invention (Nos. 2 and 4 above) are prepared in somewhat better yields and with a structure which is not only higher in molecular weight but also which is significantly more stereo regular in structure (as indicated by higher crystalline Index values).

In the above data, the "Crystalline Index" values are determined employing a GE–XRD5 defractometer and calculating the "index" by dividing the crystalline portion of the scan by the amorphous portion. The determination is applied to a sheet of the rubber molded 5 min. in a standard ASTM tensile sheet mold at 150° C. under 20,000 lbs. pressure, the sheet cooled in the press under pressure for one hour and the sample removed and allowed to cool for an additional one-half hour before testing.

EXAMPLE 4

In this example, propylene oxide homopolymers are prepared by a procedure similar to that of the foregoing examples except that due to different solubilities the polymer solutions are treated once with an aqueous solution of critic acid to remove catalyst metal residues, second with a sodium bicarbonate solution to neutralize acidity, and finally with clear water after which the solvent content is evaporated off and the polymer finally dried in a vacuum oven at 50–60° C. In each of these experiments, the original reaction mixture is made up of 150 ml. of toluene, 18 grams of liquid propylene oxide and about 2.5 ml. (equivalent to 0.05 millimole of aluminum per gram of monomer) of the catalyst solution in question. The data after polymerization for 5 hours at 90° C. are as follows:

TABLE IV

| Catalyst | Percent conversion in 1-hr. at 90° C. | RSV | Description of rubber |
|---|---|---|---|
| (1) TEAl/0.43 $CO_2$ | 8.9 | 0.9 | Soft. |
| (2) TEAl/0.43 $CO_2$/0.3 $H_2O$/0.2 AcAc/13.0 $Et_2O$ | 27.4 | 2.0 | Fairly tough rubber elastic. |
| (3) TEAl/0.43 $CO_2$/0.3 $H_2O$/0.35 AcAc/13 $Et_2O$ | 37.0 | 2.7 | Fairly tough lively rubber. |
| (4) TEAl/0.43 $CO_2$/0.37 $H_2O$/0.37 AcAc/13 $Et_2O$ | 41 | (1) | Strong, "snappy" rubber. |
| (5) TEAl/0.43 $CO_2$/0.3 $H_2O$/0.5 AcAc/13 $Et_2O$ | 31.2 | (1) | Softer than (4). |
| (6) TEAl/0.43 $CO_2$/0.4 $H_2O$/0.36 AcAc/13 $Et_2O$ | 29.5 | 2.3 | Lively tough rubber. |

[1] RSV not determined due to high viscosity of polymer solutions, indicating quite high molecular weight.

The above data indicate that extremely vigorous reactions occur with propylene oxide and that the rubbery products are of higher molecular weight and are much more rubbery than those made using the polymeric alkoxide alone as a catalyst. Polypropylene oxides such as those obtained in Experiments (2) and (3) above are found to be more highly resilient than natural rubber and are expected to find significant commercial applications as resilient shock-mounts and noise-insulating mounts, for example, in automobiles.

EXAMPLE 5

In this example, tetrahydrofuran (THF) is substituted for diethyl ether in a catalyst and polymerization mixture prepared as in Example 1 and consisting of ingredients mixed in the following molar ratios:

TEAl _____ 0.43
$CO_2$ _____ 1
$H_2O$ _____ 0.375
AcAc _____ 0.365
THF _____ 18

Such catalyst produces in 5 hours at 90° C. a tough, rubbery copolymer of epichlorohydrin and ethylene oxide in a yield of 20.7 grams of rubber per gram of TEAl employed in the catalyst and having an RSV of 5.7.

EXAMPLE 6

A number of samples of rubbery copolymers of epichlorohydrin and ethylene oxide halide made using the catalysts and process of this invention are combined on a rubber mill. The samples so combined are:

Sample No.: Chlorine content, percent/wt.
108A _____ 29.55
108B _____ 24.4
108C _____ 17.75
108D _____ 24.5
108E _____ 21.0

The blend of copolymers are compounded on a rubber mill as follows:

Material: Parts/wt.
Blend of copolymers _____ 100
Zinc stearate _____ 1
Nickel dibutyldithiocarbamate _____ 1
FEF carbon black _____ 30
Red lead _____ 5
"Na-22" [1] _____ 1.5

Cure: 30 min. at 310° F.

[1] 2-mercaptoimidazoline.

The resulting formulation is sheeted off and cured in an ASTM tensile sheet mold for the time and at the temperature indicated. The resulting sheets are tested and found to possess the following physical properties:

Original

Tensile strength (ult.) _____ lbs./sq. in__ 2000
Elongation (ult.) _____ percent__ 650
Shore A hardness _____ 59
100% modulus _____ lb./sq. in__ 200
300% modulus _____ lbs./sq. in__ 840
Gehman freeze point _____ ° C__ −43

After air aging 4 days at 300° F.

Ult. tensile _____ lbs./sq. in__ 1580
Ult. elongation _____ percent__ 420
Shore A hardness _____ 55

After aging 3 days in ASTM No. 3 oil at 300° F.

Ult. tensile _____ lbs./sq. in__ 1805
Ult. elongation _____ percent__ 350
Shore A hardness _____ 55

After immersion in water 7 days at 72° F.

Percent
Wt. increase _____ 10
Volume increase _____ 13.4

Cure: 30 minutes at 310° F.

I claim:

1. In a process of polymerizing an epoxide monomer in the presence of a catalyst prepared from an organoaluminum compound, the improvement which comprises carrying out said polymerization at temperatures between about 10° and about 100° C. in a reaction medium containing said epoxide monomer and dissolved therein a catalyst prepared by reacting, in any order at a temperature not higher than 25° C., a polymeric hydrocarbyl aluminum alkoxide containing hydrocarbyl aluminum groups with (1) from about 0.15 to about 0.40 mole of water, (2) from about 0.10 to about 0.45 mole of a chelating agent which coordinates with hydrocarbyl aluminum compounds, and (3) at least 4 moles of an ether, all based on the moles of aluminum in said aluminum alkoxide, said polymeric hydrocarbyl aluminum alkoxide being the reaction product prepared by reacting in the absence of oxygen and moisture and at a temperature of from 15 to 35° C., a trialkyl aluminum or dialkyl aluminum hydride wherein each alkyl group contains from 2 to 4 carbon atoms with from about 0.35 to about 0.45 mole of carbon dioxide per mole of aluminum, and the said catalyst being utilized in proportions equivalent to between about 0.01 and about 0.35 milligram atoms of aluminum per gram of monomer, and said epoxide monomer being selected from the class consisting of epihalohydrins, mixtures of epichlorohydrin and from about 1 mol percent to about 20 mol percent of an alkylene oxide, and propylene oxide.

2. The process as defined by claim 1 and further characterized by said polymeric hydrocarbyl aluminum alkoxide being the product of the reaction of carbon dioxide with triethyl aluminum, said chelating agent being acetyl acetone, and by said epoxide monomer being epichlorohydrin polymerized alone.

3. The process as defined by claim 1 and further characterized by said polymeric hydrocarbyl aluminum alkoxide being the product of the reaction of carbon dioxide with triethyl aluminum, said chelator being acetyl acetone, the said epoxide monomer being a mixture consisting of epichlorohydrin containing from about 1 mole percent to about 20 mol percent of ethylene oxide, and by the proportion of catalyst ingredient (1) being selected in the range recited to yield the desired rate of polymerization and the proportion of catalyst ingredient (2) being selected in the range recited to yield the desired molecular weight in the resulting rubbery copolymer product.

4. The process as defined in claim 1 and further characterized by said polymeric hydrocarbyl aluminum alkoxide being the product of the reaction of carbon dioxide with triethyl aluminum, said chelating agent is acetyl acetone, the said epoxide monomer being epichlorohydrin polymerized alone, and by the proportion of catalyst ingredient (1) being selected in the range recited to yield the desired rate of polymerization and by the proportion of catalyst ingredient (2) being selected in the range recited to yield the desired molecular weight in the resulting homopolymer product.

References Cited

UNITED STATES PATENTS 3,065,187   11/1962   Vanderberg _____ 260—2 EPA

OTHER REFERENCES

Organometallic Chemistry by H. Zeiss, 1960.

WILLIAM H. SHORT, Primary Examiner

T. PERTILLA, Assistant Examiner

U.S. Cl. X.R.

260—47 EP, 80 C, 88.3 A

PO-1050
(5/69)

UNITED STATES PATENT OFFICE
CERTIFICATE OF CORRECTION

Patent No. 3,645,920          Dated February 29, 1972

Inventor(s) ROBERT K. SCHLATZER, JR.

It is certified that error appears in the above-identified patent and that said Letters Patent are hereby corrected as shown below:

Col. 2, line 41, in the formula change "$(CO_2CH_3)_3$" to read --$(CH_2CH_3)_3$--.

Col. 3, line 2, "realy" should read --ready--; line 17 " carbonyl" should read -- carboxyl--; line 27 in the formula - "a thio group" should read --a thioester--;

Col. 7, in the table, 2nd column "68 plus" should read --68B plus--.

Col. 9, line 1 "critic" should read --citric--; line 53, delete "halide".

Throughout the specification "TEA1" should read --TEAL-- in Col. 6, line 33, 37, 49, 54 and 68; col. 7, line 21, 22, Table I, Table II, Table III; col. 8 line 14, 21 and after Table 1 at the left in the line starting with (2); col. 9, Table IV; in Example 5 combine --TEAL----0.43 $CO_2$:1 in the table and correct "TEAL" in line 50.

Signed and sealed this 25th day of July 1972.

(SEAL)
Attest:

EDWARD M. FLETCHER, JR.        ROBERT GOTTSCHALK
Attesting Officer                Commissioner of Patents